(12) United States Patent
Lair

(10) Patent No.: US 7,010,905 B2
(45) Date of Patent: Mar. 14, 2006

(54) VENTILATED CONFLUENT EXHAUST NOZZLE

(75) Inventor: Jean-Pierre Lair, San Antonio, TX (US)

(73) Assignee: The NORDAM Group, Inc., Tulsa, OK (US)

(*) Notice: Subject to any disclaimer, the term of this patent is extended or adjusted under 35 U.S.C. 154(b) by 111 days.

(21) Appl. No.: 10/781,522

(22) Filed: Feb. 18, 2004

(65) Prior Publication Data

US 2005/0188676 A1    Sep. 1, 2005

Related U.S. Application Data

(60) Provisional application No. 60/449,082, filed on Feb. 21, 2003.

(51) Int. Cl.
    F02K 3/02     (2006.01)
    B64D 33/04    (2006.01)
    B05D 12/00    (2006.01)

(52) U.S. Cl. .................. 60/226.1; 60/226.2; 60/226.3; 239/265.25; 244/53 R; 244/110 B

(58) Field of Classification Search ............... 60/226.1, 60/226.2, 226.3, 770, 771; 224/110 B, 53 R; 239/265.17, 265.19, 265.25
See application file for complete search history.

(56) References Cited

U.S. PATENT DOCUMENTS

| | | | |
|---|---|---|---|
| 3,779,010 A | 12/1973 | Chamay et al. | |
| 3,820,719 A | 6/1974 | Clark | |
| 4,291,782 A * | 9/1981 | Klees | 181/215 |
| 4,501,393 A * | 2/1985 | Klees et al. | 239/265.13 |
| 4,922,712 A | 5/1990 | Matta et al. | |
| 4,922,713 A | 5/1990 | Barbarin et al. | |
| 5,181,676 A | 1/1993 | Lair | |
| 5,221,048 A | 6/1993 | Lair | |
| 5,655,360 A | 8/1997 | Butler | |
| 5,694,767 A | 12/1997 | Vdoviak et al. | |
| 5,778,659 A | 7/1998 | Duesler et al. | |
| 5,779,192 A | 7/1998 | Metezeau et al. | |
| 5,819,527 A | 10/1998 | Fournier | |
| 5,826,823 A | 10/1998 | Lymons et al. | |
| 5,853,148 A | 12/1998 | Standish et al. | |
| 5,863,014 A | 1/1999 | Standish | |
| 5,875,995 A | 3/1999 | Moe et al. | |
| 5,908,159 A * | 6/1999 | Rudolph | 239/265.17 |
| 5,913,476 A | 6/1999 | Gonidec et al. | |
| 5,934,613 A | 8/1999 | Standish et al. | |
| 6,070,407 A | 6/2000 | Newton | |
| 6,101,807 A | 8/2000 | Gonidec et al. | |
| 6,751,944 B1 * | 6/2004 | Lair | 60/226.3 |

* cited by examiner

Primary Examiner—Charles G. Freay
(74) Attorney, Agent, or Firm—Francis L. Conte

(57) ABSTRACT

An exhaust nozzle includes an outer duct surrounding an inner duct. The inner duct includes a main outlet, and a row of apertures spaced upstream therefrom. The outer duct includes a row of intakes at a forward end, an auxiliary outlet at an aft end, and surrounds the inner duct over the apertures to form a bypass channel terminating at the auxiliary outlet. A row of flaps are hinged at upstream ends to selectively cover and uncover the apertures for selectively bypassing a portion of exhaust flow from the inner duct through the outer duct in confluent streams from both main and auxiliary outlets. When the flaps cover the apertures, the intakes ventilate the bypass channel and discharge flow through the auxiliary outlet.

30 Claims, 6 Drawing Sheets

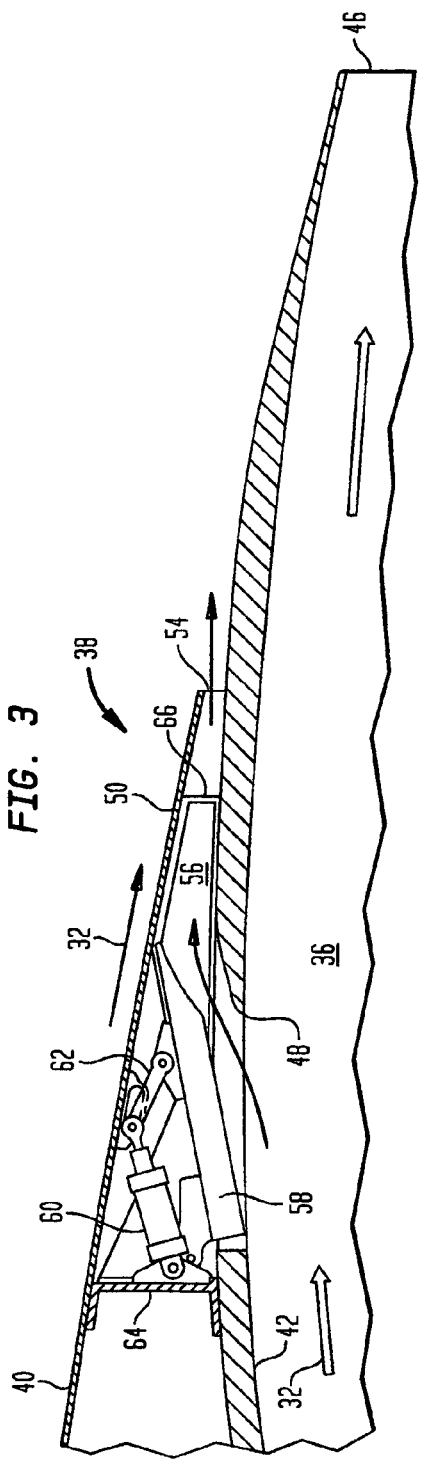
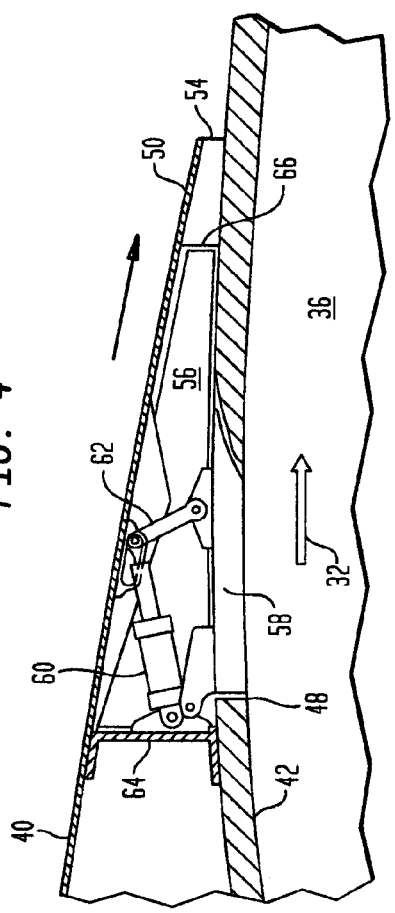

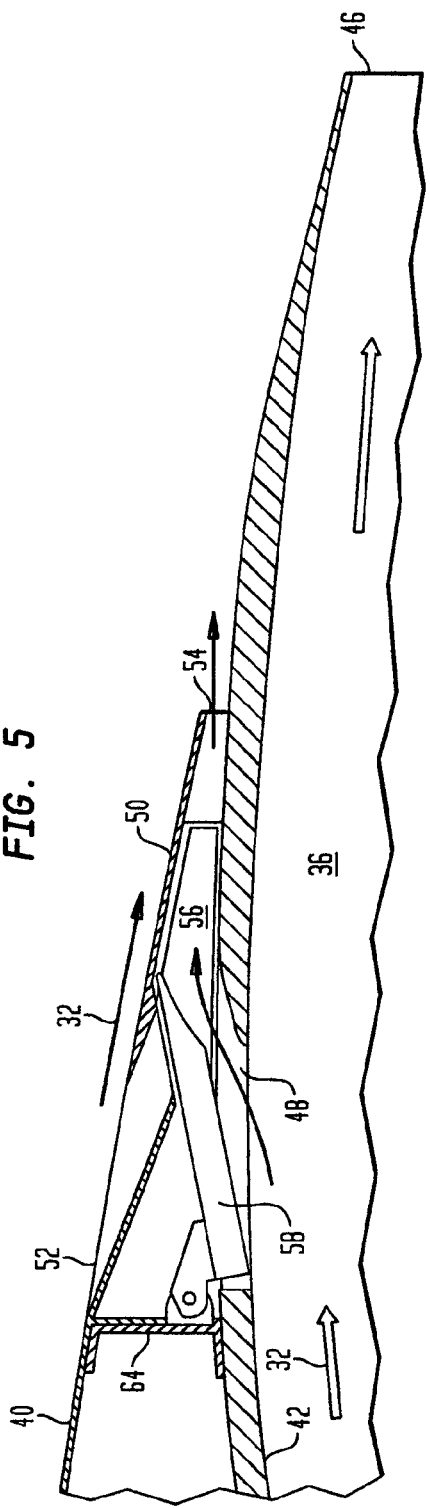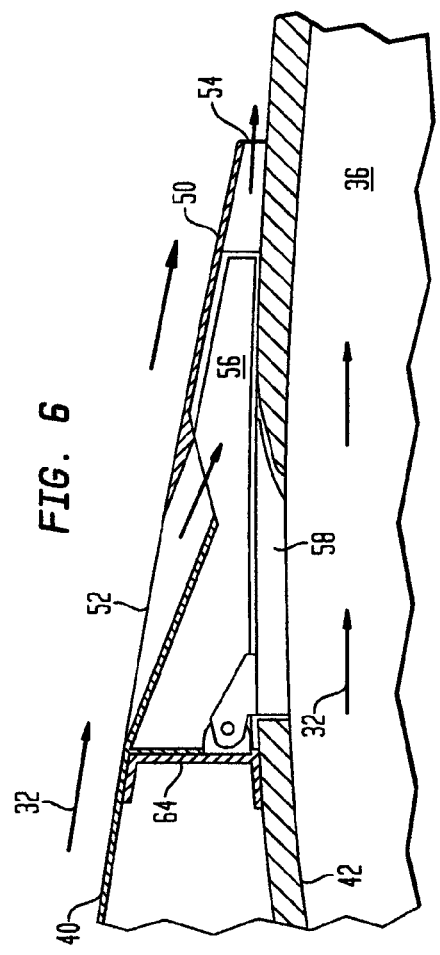

VENTILATED CONFLUENT EXHAUST NOZZLE

This application claims the benefit of U.S. Provisional Application No. 60/449,082; filed Feb. 21, 2003.

BACKGROUND OF THE INVENTION

The present invention relates generally to turbofan aircraft engines, and, more specifically, to exhaust nozzles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the engine.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944; and entitled "Confluent Variable Exhaust Nozzle," assigned to the present assignee, and incorporated herein by reference, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the auxiliary outlet itself is no longer utilized following takeoff operation, and may introduce base drag thereat during the remainder of the aircraft flight, including the typically long duration cruise operation.

Accordingly, it is desired to obtain the various benefits of using the confluent variable exhaust nozzle, while further improving the performance thereof, including the reduction of any base drag attributable thereto during operation.

BRIEF SUMMARY OF THE INVENTION

An exhaust nozzle includes an outer duct surrounding an inner duct. The inner duct includes a main outlet, and a row of apertures spaced upstream therefrom. The outer duct includes a row of intakes at a forward end, an auxiliary outlet at an aft end, and surrounds the inner duct over the apertures to form a bypass channel terminating at the auxiliary outlet. A row of flaps are hinged at upstream ends to selectively cover and uncover the apertures for selectively bypassing a portion of exhaust flow from the inner duct through the outer duct in confluent streams from both main and auxiliary outlets. When the flaps cover the apertures, the intakes ventilate the bypass channel and discharge flow through the auxiliary outlet.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is a partly sectional axial view through the fan nozzle shown in FIG. 2 and taken along line 3—3, and illustrating a flap opened by an actuator.

FIG. 4 is a partly sectional axial view, like FIG. 3, of the flap closed by the actuator.

FIG. 5 is a partly sectional axial view of the fan nozzle shown in FIG. 2 and taken along line 5—5, and illustrating an open flap adjacent to an outer intake.

FIG. 6 is a partly sectional axial view, like FIG. 5, of the flap shown closed in the nozzle.

DETAILED DESCRIPTION OF THE INVENTION

Figure 1:
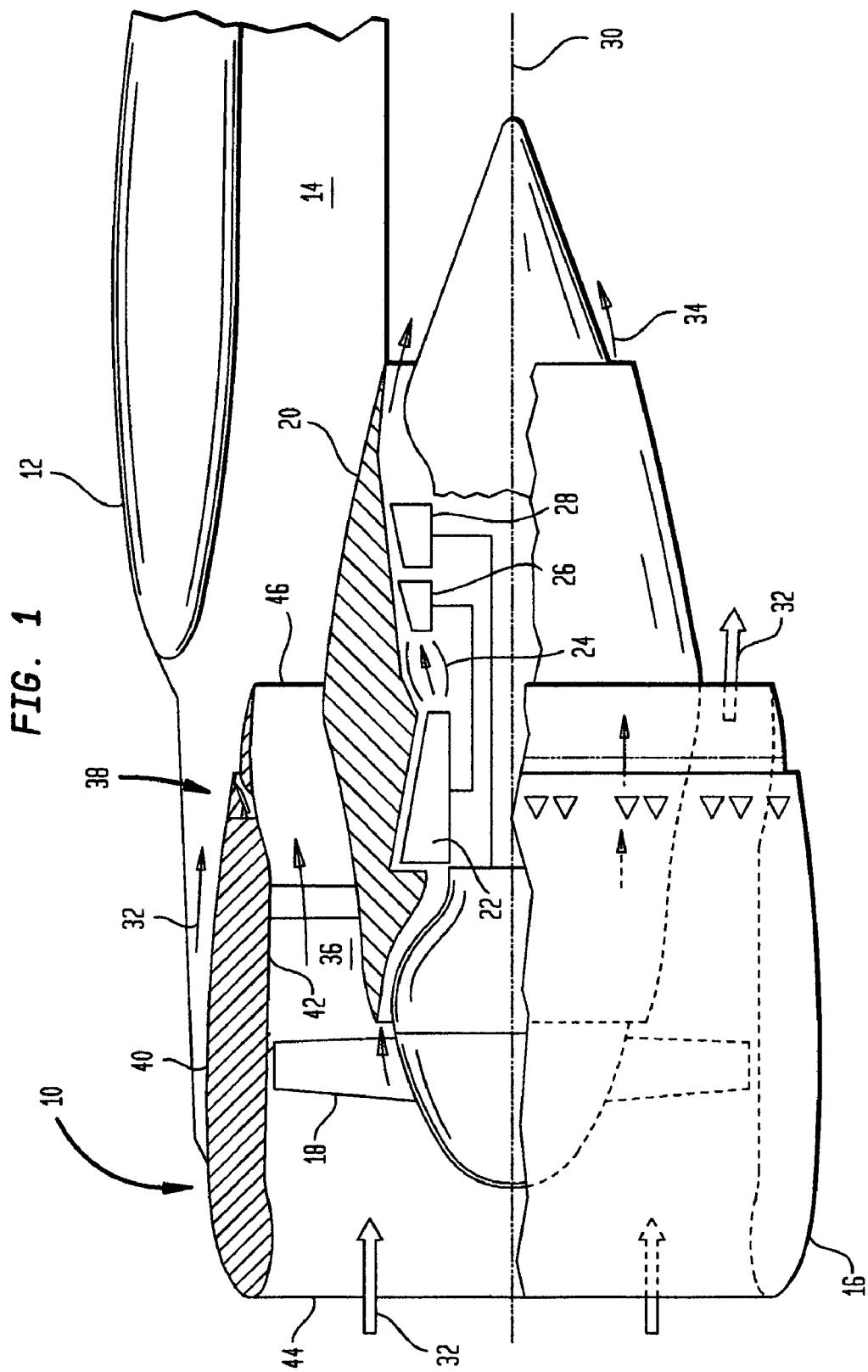
FIG. 1 is a partly sectional axial view of an exemplary turbofan aircraft gas turbine engine mounted to the wing of an aircraft and including a fan exhaust nozzle.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of air is pressurized by the driven fan 18 and bypasses the core engine through a substantially annular bypass duct 36 which terminates in a fan exhaust nozzle 38 for producing a substantial portion of the propulsion thrust which powers the aircraft in flight. The combustion gases 34 are exhausted from the aft outlet of the core engine for providing additional thrust.

The fan nacelle includes radially outer and inner cowlings or skins 40,42 which extend axially from a leading edge of the nacelle defining an annular inlet 44 to an opposite trailing edge defining an annular outlet 46. The fan nacelle may have any conventional configuration, and is typically formed in two generally C-shaped halves which are pivotally joined to the supporting pylon 14 for being opened during maintenance operation.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle by a row of supporting struts in a conventional manner. The core cowl 20 is spaced radially inwardly from the inner skin 42 of the fan nacelle to define the bypass duct 36 therebetween which bypasses the major portion of the fan air around the core engine during operation. The fan bypass duct terminates in the annular, or partly annular fan nozzle 38 at the nacelle trailing edge or outlet 46.

The fan nozzle 38 illustrated in FIG. 1 is configured in accordance with the present invention for variable area performance for reducing exhaust noise during aircraft takeoff operation. The variable fan nozzle 38 is illustrated in more detail in FIGS. 2 and 3 and includes the aft portion of the bypass duct 36 which defines an inner duct within the fan nacelle having the main outlet 46 at the aft end thereof. Spaced upstream from the main outlet 46 is a row of circumferentially spaced apart, radial inlet apertures 48.

An annular outer duct 50 is disposed at the aft end of the fan nacelle coextensive with the outer skin 40 for maintaining an aerodynamically smooth outer mold line (OML) or outer surface of the nacelle having minimal aerodynamic drag. As initial shown in FIG. 2, the outer duct 50 includes a row of outer intakes 52 disposed through the outer skin of the duct at a forward end thereof.

Figure 2:
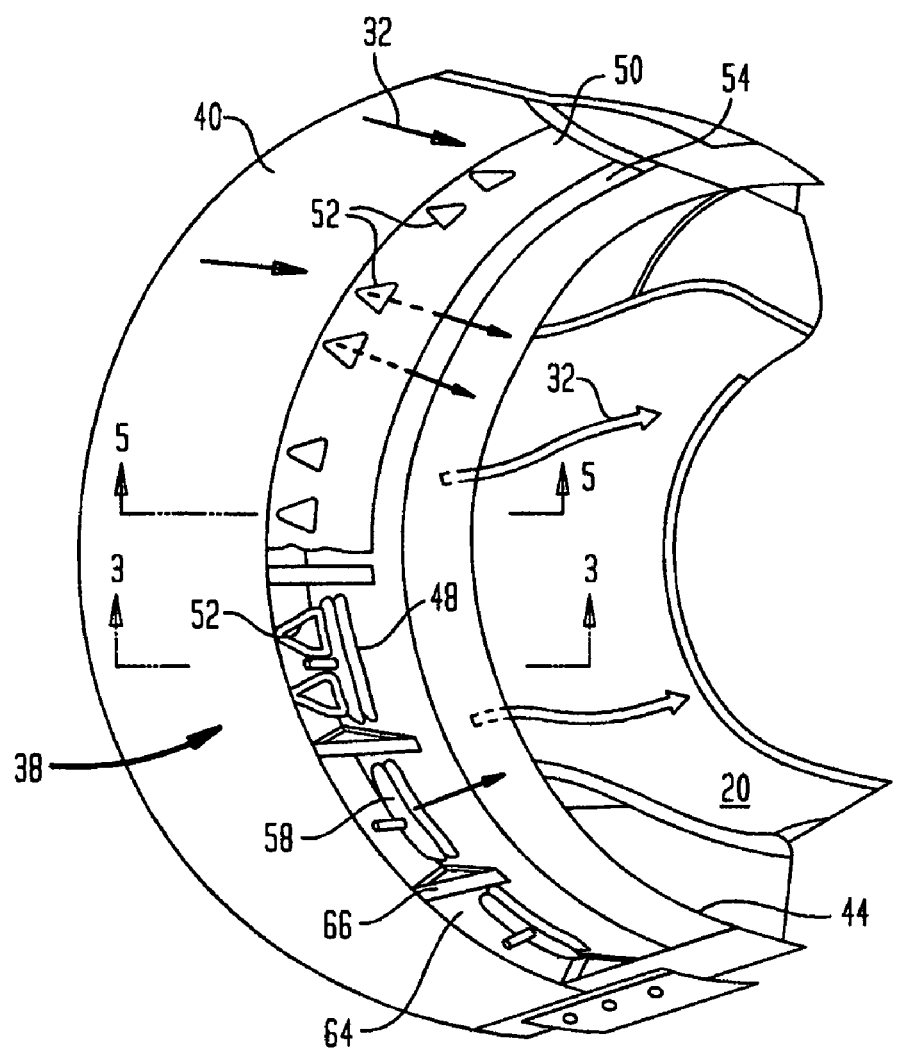
FIG. 2 is an aft-facing-forward isometric view of a portion of the fan nacelle and fan nozzle illustrated in FIG. 1.

An auxiliary outlet 54 is disposed at the aft end of the outer duct concentric about the fan bypass duct 36. As shown in FIGS. 2 and 3, the outer duct 50 is spaced radially outwardly from and surrounds the inner duct 36 over the row of apertures 48 to form a bypass channel 56 which begins at the apertures 48 and terminates at the outlet 54.

A plurality of doors or flaps 58 are hinged at upstream ends thereof to selectively cover and uncover corresponding ones of the apertures 48 and selectively bypass a portion of the exhaust flow 32 from the inner duct 36 through the outer duct 50 in confluent streams from both the main and auxiliary outlets 46,54.

In this way, the auxiliary outlet 54 provides a temporary increase in the overall discharge flow area for the fan bypass air 32 specifically during takeoff operation of the aircraft. The increased flow area of the main and auxiliary outlets 46,54 temporarily reduces the velocity of the fan exhaust and therefore reduces the associated noise therefrom.

Furthermore, bypassing a portion of the fan exhaust through the outer duct 50 energizes the ambient airflow 32 outside the nacelle and reduces the thickness of the associated boundary layer. In this way, the external ambient air is locally accelerated in velocity where it meets the higher velocity fan exhaust discharged from the main outlet 46, which in turn reduces the differential velocity and shearing between the two confluent streams for further enhancing noise attenuation.

FIG. 3 illustrates the open flaps 58 for bypassing a portion of the fan exhaust 32 from the inner duct 36 through the outer duct 50 during takeoff operation. FIG. 4 illustrates the flaps 58 closed in their respective apertures 48 after takeoff operation, with the entirety of the fan exhaust 32 being discharged through the inner duct 36 and the main outlet at the aft end thereof.

The individual flaps 58 illustrated in FIGS. 3 and 4 may be opened and closed in any suitable manner. For example, a plurality of spring actuators 60 are mounted inside the outer duct for providing means for opening and closing the flaps when desired. The actuators are effective for closing the flaps during most of the flight envelope of the aircraft, including cruise operation, while permitting the flaps to open and uncover the respective apertures 48 specifically during takeoff operation.

The actuators 58 are preferably passive devices without the need for external power, which is effected by including an internal spring in each actuator which biases the corresponding output rods thereof in their extended positions.

The internal springs in each actuator may be suitably sized for permitting each of the flaps to open and uncover the apertures under differential pressure between the inner and outer ducts 36,50. Since the fan exhaust 32 has a substantial pressure during operation, this pressure is exerted over the inner surfaces of the several flaps 58 which tends to deploy them open.

However, the closing force effected by the actuators may be predetermined to maintain closed the flaps 58 until sufficient pressure is developed in the fan exhaust 32 to overcome the closing spring force and open the flaps during takeoff operation at relatively high power and air pressure. Correspondingly, the pressure of the fan exhaust during cruise operation is relatively lower which will permit the spring actuators to re-close the flaps for cruise operation.

As shown in FIGS. 3 and 4, each of the actuators 60 includes a respective output rod which is suitably pivotally joined to a corresponding flap 58 by a sliding link 62. The inner end of the link 62 is pivotally joined in a suitable clevis to the outer side of one of the flaps 58, while the outer end of each link 62 is mounted in an elongate sliding track fixedly joined to the inner surface of the outer duct.

The kinematic dimensions and angular positions of the actuator and the sliding link are selected for pulling open each flap 58 as shown in FIG. 3 as the output rod of the actuator is retracted inside the housing of the actuator. In FIG. 4, the output rod of the actuator is extended by the internal spring, which in turn displaces the sliding link radially inwardly to close the corresponding flap 58.

The actuator 60 may be joined to the corresponding flaps in various manners other than those illustrated in FIGS. 3 and 4, and may be replaced by active actuators, either hydraulic, pneumatic, or electrical, with powered output rods for opening or closing the flaps as desired.

As illustrated in FIGS. 2 and 3, the fan nozzle preferably includes a radial frame 64 which extends circumferentially between the outer and inner ducts immediately forward of the row of apertures 48. The individual flaps 58 are suitably hinged at their upstream ends to the radial frame 64. A plurality of longitudinal frames 66 extend axially rearwardly from the radial frame, and are disposed circumferentially between corresponding ones of the apertures 48. The longitudinal frames are tapered thinner in the aft direction to match the contour of the outer duct 50 which converges in the aft direction.

The radial and longitudinal frames cooperate together to provide structural support for introduction of the row of apertures 48, while supporting the outer duct 50 and the row of intakes 52 provided therein. The longitudinal frames 66 are preferably imperforate to prevent crossflow between the circumferentially adjacent apertures 48 and to confine exhaust flow rearwardly through the corresponding bypass channels 56 disposed between the row of longitudinal frames 66.

As illustrated in FIGS. 2 and 5, the intakes 52 are circumferentially aligned with corresponding ones of the flaps 58, and therefore are preferably blocked thereby when the flaps are opened to uncover the apertures. In this way, opening the flaps 58 during takeoff operation correspondingly opens the bypass channels 56 while closing the discharge ends of the respective intakes 52. However, when the flaps 58 are closed as illustrated in FIG. 6, the corresponding intakes 52 are then unblocked by the flaps and permit external ambient air 32 to flow into the flaps 58 for ventilating the bypass channels 56, with the ventilated air then being discharged through auxiliary outlet 54.

As illustrated in FIG. 5, the auxiliary outlet 54 is preferably spaced axially upstream from the main outlet 46 in parallel planes. This provides coplanar exhaust outlets.

Correspondingly, the outer and inner ducts 50,36 converge aft toward the respective outlets thereof to provide concentric and confluent exhaust flow discharge when the flaps are open. The internal bypass channels 56 preferably also converge aft to the auxiliary outlet 54. And, that auxiliary outlet 54 provides a local interruption in the aerodynamic continuity of the outer skin of the fan nacelle between the auxiliary outlet 54 and the main outlet 46.

The auxiliary outlet 54 preferably smoothly blends with the outer skin downstream therefrom for providing an aerodynamically smooth transition for both the fan exhaust 32 channeled through the bypass channels 56 when the flaps are open, and the external freestream airflow 32 channeled through the intakes 52 when the flaps are closed. Both the fan exhaust and the ambient ventilation air are commonly channeled through the bypass channels 56 for discharge from the same auxiliary outlet 54 during operation, but at different times.

As indicated above, fan exhaust discharge through the auxiliary outlet 54 energizes the freestream ambient airflow thereover, while decreasing the relative velocity between ambient freestream and the fan exhaust at the main outlet 46. When the flaps 58 are closed, some of the ambient freestream airflow enters the intakes 52 for ventilating the bypass channels 56 and reducing the base drag in the region downstream of the auxiliary outlet 54.

As shown in FIGS. 2 and 5, the intakes 52 are preferably flush in the outer skin 40 of the outer duct 50 for reducing aerodynamic drag from the introduction thereof.

The intakes 52 may have any suitable shape such as the triangular shape illustrated in FIG. 2 in which the apex of the triangular inlet faces upstream, and the base faces downstream in the form of a typical National Advisory Committee for Aeronautics (NACA) type air inlet which maximizes inlet performance with minimal drag.

Furthermore, the intakes 52 are preferably in the form of channels or troughs inclined inwardly toward the respective bypass channels 56 as illustrated in FIGS. 5 and 6. The trough form of the intakes 52 preferably terminates upstream from the auxiliary outlet 54 for engaging the respective flaps 58 when open. In this way, the row of intakes 52 are self-closing at their discharge ends by the flaps 58 when open thereagainst.

As shown in FIG. 2, each of the flaps 58 is circumferentially elongate between adjacent ones of the longitudinal frames 66, and cooperates with two of the intakes 52 disposed upstream therefrom. In this way, a pair of the intakes 52 feed each of the bypass channels 56 between the longitudinal frames, and both intakes are simultaneously closed by the opening of an individual flap 58.

In the exemplary embodiment illustrated in FIGS. 2 and 5, the auxiliary outlet 54 is arcuate around the circumference of the nacelle, and defines a common annulus at least in part around the inner bypass duct 36. The auxiliary outlet 54 may be fully annular in some turbofan configurations, or may form a half annulus for the typical C-duct form of fan nacelles formed in two halves on opposite sides of the engine.

Figure 7:
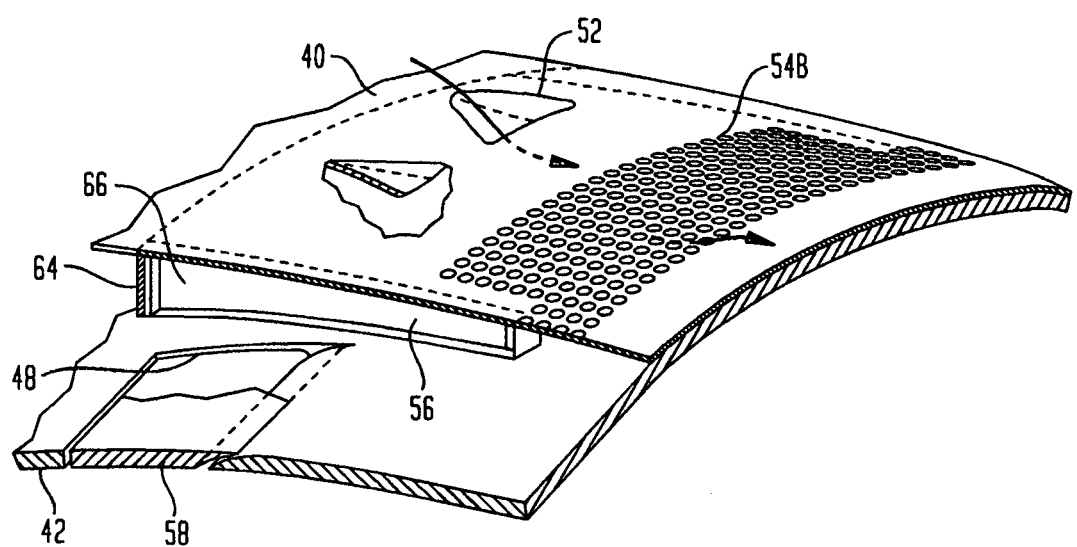
FIG. 7 is an isometric view of a portion of the exhaust nozzle illustrated in FIG. 2 in accordance with an alternate embodiment.

FIG. 7 illustrates an alternate embodiment of the fan nozzle shown in FIG. 5, except for a continuous outer skin 40 extending downstream to the main outlet 46, and closed thereat. The outer skin includes a multitude of auxiliary outlet apertures designated 54B, in a multi-row pattern at the outlet end of the bypass channel 56. The individual holes 54B may be circular or elliptical in the downstream direction and collectively provide sufficient additional exhaust area for discharging the fan exhaust from the bypass channel 56 when the flaps 58 are open.

By maintaining the continuity of the outer skin 40, local interruptions therein may be minimized for further minimizing associated aerodynamic drag during operation. The intakes 52 have proven NACA-profiles for efficiently ventilating the bypass channels 56 with minimal drag along the outer skin. Correspondingly, the multitude of auxiliary outlet holes 54B formed in the otherwise flat and continuous surface of the outer skin 40 also minimize aerodynamic drag during operation.

The ventilated confluent exhaust nozzle disclosed above may be used in various turbofan engines with a long or short fan nacelles. And, the nozzle may be used in engines with or without thrust reversers.

Figure 8:
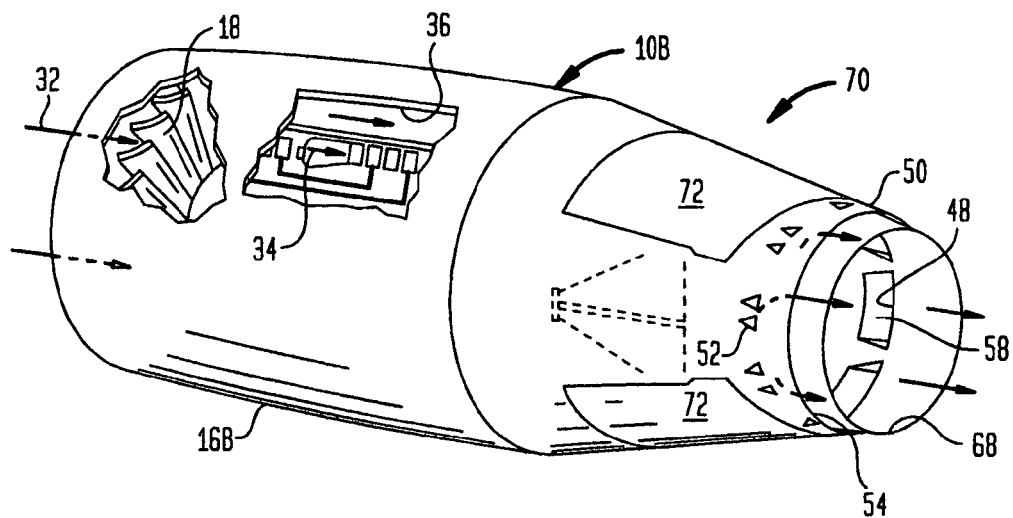
FIG. 8 is an isometric view of a long duct turbofan engine including a thrust reverser and a corresponding embodiment of the confluent exhaust nozzle disposed downstream therefrom.

For example, FIG. 8 illustrates another turbofan engine 10B in which the fan nacelle 16B extends the full length of the engine to a common exhaust outlet 68 at the aft end thereof. The fan bypass duct 36 terminates inside the engine upstream from the common outlet 68 for mixing the fan exhaust with the core exhaust inside the engine and upstream from the common outlet. A thrust reverser 70 is located upstream from the common outlet 68 and includes a pair of thrust reverser doors 72 covering corresponding side openings in the engine.

Figure 9:
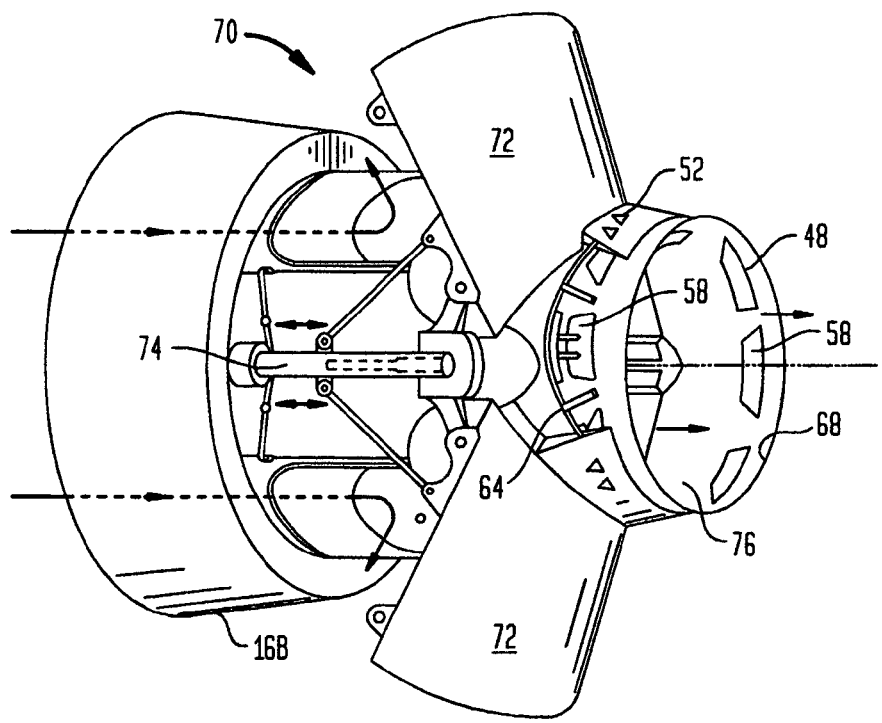
FIG. 9 is a isometric view of the thrust reverser illustrated in FIG. 8 in its deployed position upstream from the confluent exhaust nozzle.

As shown in FIG. 9, a pair of actuators 74 are disposed on opposite sides of the engine for providing means to selectively open the doors to uncover the side openings for reversing thrust from the combined fan exhaust and core engine exhaust during landing operation.

The exemplary thrust reverser 70 illustrated in FIG. 9 may have any conventional configuration, and includes integral forward and aft barrels which define an inner duct 76 integrally joined together by lateral beams defining the two side openings which are covered by the two doors 72. The inner duct 72 receives the exhaust from both the core engine and the fan bypass duct.

The ventilated confluent exhaust nozzle disclosed above may be suitably incorporated into the aft end of the long duct turbofan engine illustrated in FIGS. 8 and 9. For example, the outer duct 50 is introduced as the aft end of the nacelle 16B which forms a smooth outer mold line with the forward barrel and doors when stowed closed. The intakes 52 are provided in the outer skin downstream of the doors. The inlet apertures 48 are formed in the inner duct 76 and are closed by the flaps 58 located between the inner and outer ducts in the same manner described above in the first embodiment.

During takeoff operation of the engine as illustrated in FIG. 8, the thrust reverser doors 72 are locked closed and flush in the nacelle 16B, and the flaps 58 may be selectively opened for temporarily increasing the total exhaust flow area from the engine by introducing the additional area from the auxiliary outlet 54 surrounding the common outlet 68.

The various embodiments of the ventilated confluent exhaust nozzle disclosed above permit a temporary increase in total exhaust flow area during takeoff operation of the engine for reducing the differential velocity between the ambient freestream airflow and the engine exhaust.

In FIG. 1, the introduction of the ventilated fan nozzle decreases the differential velocity between the fan air and the ambient freestream airflow for attenuating noise during takeoff operation, while minimizing base drag during cruise operation.

In the FIG. 8 embodiment, the ventilated exhaust nozzle decreases the differential velocity between the common exhaust flow and the ambient freestream air for also attenuating noise during takeoff operation, while decreasing base drag during cruise operation.

The flaps in the embodiments disclosed above are fully contained between the outer and inner skins of the nacelle and occupy little space, introduce little additional weight, and are relatively simple to incorporate in the available limited space.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
   an inner duct having a main outlet at an aft end thereof, and including a row of radial apertures spaced upstream from said outlet;
   an outer duct having a row of intakes at a forward end thereof, an auxiliary outlet at an end thereof, and surrounding said inner duct over said apertures to form a bypass channel terminating at said auxiliary outlet; and
   a plurality of flaps hinged at upstream ends thereof to selectively cover and uncover corresponding ones of said apertures and selectively bypass a portion of exhaust flow from said inner duct through said outer duct in confluent streams from both said main and auxiliary outlets.

2. A nozzle according to claim 1 further comprising:
   a radial frame extending circumferentially between said outer and inner ducts forward of said apertures; and
   a plurality of longitudinal frames extending axially from said radial frame and disposed circumferentially between corresponding ones of said apertures.

3. A nozzle according to claim 2 wherein said intakes are aligned with corresponding ones of said flaps, and are blocked thereby when said flaps uncover said apertures.

4. A nozzle according to claim 3 wherein said intakes are flush in an outer skin of said outer duct.

5. A nozzle according to claim 4 wherein said intakes comprise troughs inclined inwardly toward said bypass channel.

6. A nozzle according to claim 5 wherein said trough intakes terminate upstream from said auxiliary outlet for engaging said flaps when open.

7. A nozzle according to claim 6 wherein said intakes are triangular, and include an upstream facing apex and downstream facing base.

8. A nozzle according to claim 4 wherein said outer and inner ducts converge aft toward said outlets thereof to provide concentric and confluent exhaust flow discharge when said flaps are open.

9. A nozzle according to claim 8 wherein said bypass channel converges aft to said auxiliary outlet.

10. A nozzle according to claim 4 wherein said auxiliary outlet is axially spaced upstream from said main outlet in parallel planes.

11. A nozzle according to claim 4 further comprising two of said intakes disposed upstream of each of said flaps.

12. A nozzle according to claim 4 further comprising means for closing said flaps atop said apertures for blocking flow therethrough.

13. A nozzle according to claim 4 further comprising means for permitting said flaps to open and uncover said apertures under differential pressure between said inner and outer ducts.

14. A nozzle according to claim 4 further comprising a plurality of spring actuators mounted between corresponding ones of said flaps and said radial flame for biasing closed said flaps atop said apertures.

15. A nozzle according to claim 14 wherein said actuators are sized for permitting said flaps to open and uncover said apertures under differential pressure between said inner and outer ducts.

16. A nozzle according to claim 15 wherein said actuators are passive devices without external power.

17. A nozzle according to claim 14 wherein each of said actuators includes an output rod joined to a corresponding flap by a sliding link.

18. A nozzle according to claim 4 further comprising a thrust reverser disposed upstream of said radial frame.

19. A nozzle according to claim 18 wherein said thrust reverser includes:
   a plurality of doors covering corresponding side openings; and
   means for selectively opening said doors to uncover said side openings for reversing thrust from said exhaust flow.

20. A nozzle according to claim 19 wherein said thrust reverser further comprises:

a forward barrel and an aft barrel defining said inner duct integrally joined together by lateral beams defining said side openings therebetween; and said outer duct forms a smooth outer mold line with said forward barrel and doors when stowed closed.

21. A nozzle according to claim 4 wherein said auxiliary outlet is an annulus at least in part around said inner duct.

22. A nozzle according to claim 4 wherein said auxiliary outlet comprises a pattern of apertures in said outer skin.

23. A gas turbine engine exhaust nozzle comprising:

an inner duct having a main outlet at an aft end thereof, and including a row of radial apertures spaced upstream from said outlet;

an outer duct having a row of triangular intakes at a forward end thereof, an auxiliary outlet at an end thereof, and surrounding said inner duct over said apertures to form a bypass channel terminating at said auxiliary outlet;

a plurality of flaps hinged at upstream ends thereof to selectively cover and uncover corresponding ones of said apertures and selectively bypass a portion of exhaust flow from said inner duct through said outer duct in confluent streams from both said main and auxiliary outlets; and wherein said intakes are aligned with corresponding ones of said flaps, and are blocked thereby when said flaps uncover said apertures.

24. A nozzle according to claim 23 further comprising means for selectively opening said flaps to block said intakes and unblock flow from said apertures, through said bypass channel, and out said auxiliary outlet, and in reverse closing said flaps atop said apertures to block flow therefrom while unblocking flow from said intakes, through said bypass channel, and out said auxiliary outlet.

25. A nozzle according to claim 24 wherein said intakes are flush in an outer skin of said outer duct.

26. A nozzle according to claim 25 wherein said auxiliary outlet is spaced upstream from said main outlet.

27. A nozzle according to claim 26 further comprising:

a radial frame extending circumferentially between said outer and inner ducts forward of said apertures; and a plurality of longitudinal frames extending axially from said radial frame and disposed circumferentially between corresponding ones of said apertures.

28. A nozzle according to claim 27 wherein said intakes comprise troughs inclined inwardly toward said bypass channel.

29. A nozzle according to claim 28 further comprising two of said intakes disposed upstream of each of said flaps.

30. A nozzle according to claim 29 wherein said means are passive for permitting said flaps to open and uncover said apertures under differential pressure between said inner and outer ducts.

* * * * *